United States Patent

Macleod

[15] 3,700,898
[45] Oct. 24, 1972

[54] INSTRUMENTS FOR ANALYZING SUBSTANCES BY DETERMINING THEIR RADIATION ABSORPTION CHARACTERISTICS

[72] Inventor: Hugh Angus McIntosh Macleod, Newcastle-upon-Tyne, England

[73] Assignee: Sir Howard Grubb Parson & Company Limited, Walkergate, Newcastle-upon-Tyne, England

[22] Filed: Feb. 3, 1971

[21] Appl. No.: 112,377

[30] Foreign Application Priority Data

Feb. 3, 1970 Great Britain............5,076/70

[52] U.S. Cl. .........................250/83.3 H, 250/43.5 R
[51] Int. Cl. ............................................G01j 3/02
[58] Field of Search ....................250/43.5 R, 83.3 H

[56] References Cited

UNITED STATES PATENTS

| | | |
|---|---|---|
| 3,491,366 | 1/1970 | Harrick.............250/83.3 H X |
| 3,471,698 | 10/1969 | Mausteller et al..250/43.5 RX |
| 3,464,757 | 9/1969 | Schmidt et al. ......250/83 R X |

*Primary Examiner*—Archie R. Borchelt
*Attorney*—Holman & Stern

[57] ABSTRACT

An instrument for analyzing substances by determining their radiation absorption characteristics when subjected to a beam of radiation, wherein, the optical components of the instrument are mounted on support members which lie in at least two intersecting planes. The support members may take the form of two flat plate members lying at an angle to one another in the manner of a pitched roof with the optical components supported on each flat member.

6 Claims, 2 Drawing Figures

INSTRUMENTS FOR ANALYZING SUBSTANCES BY DETERMINING THEIR RADIATION ABSORPTION CHARACTERISTICS

This invention relates to instruments for analyzing substances by determining their absorption characteristics when subjected to radiation, for example radiation in the infra-red region of the spectrum.

Typical of such instruments is the double-beam, infrared analyzer in which the energy in one beam of infra-red radiation passing through a sample substance under test is compared with the energy in a second beam, acting as a reference beam, which does not pass through the sample substance. In one form, the same narrow band of wavelength is isolated in each beam, the band being one in which a particular substance is known to absorb and the energy transmitted by the sample and reference beam is compared. Such arrangements have the advantage that instrumental drifts are compensated.

In another form of instrument, the sample substance is submitted alternately to a beam of radiation within a narrow band of wavelength where absorption occurs and a narrow band where no absorption occurs. Such instruments not only compensate for instrumental drifts, but also compensate for any variation in the obscuration in the windows of the cell containing the sample or changes in the surface characteristics of a reflecting sample.

In the latter form of instrument, a beam of radiation may be switched alternately between two paths, one path having a wavelength selection device to select a narrow band of wavelengths where absorption occurs in the sample and the other a wavelength selection device which selects a narrow wavelength band where little or no absorption takes place. The beams are recombined and focussed on a detector but chopped alternately so that the detector receives radiation from each path alternately.

Suitable wavelength selection devices are interference filters, diffraction gratings or prisms.

Generally speaking, the number and disposition of optical components in such instruments is such that they need to be mounted on a rigid base plate to avoid inaccuracies due to distortion of the base plate. The size of the base plate is governed by the number and spacing of the optical components and in many instances, because of its size, it has to be of substantial thickness to minimize distortion and this adds to the cost and weight of the instrument.

According to the present invention an instrument for analyzing substances by determining their radiation absorption characteristics when subjected to a beam of radiation is characterized in that the optical components of the instrument are mounted on support members which lie in at least two intersecting planes.

In a preferred embodiment the support members take the form of two flat plate members lying at an angle to one another in the manner of a pitched roof with the optical components supported on each flat member.

In an instrument embodying support members in accordance with the preceding paragraph, a source of infra-red radiation is mounted on one support member and the beam of radiation from the source is directed onto a beam splitting device located adjacent the apex formed by the two support members. From the beam splitting device the beam is formed into two beams which are directed in paths parallel to the apex to fall on wavelength selection devices before being reflected back along parallel paths to fall again on the beam splitter device, from which device the beams are directed along a beam path in the other support member to fall on a radiation detector, radiation chopping means being provided between the beam splitting device and the wavelength selection devices to interrupt each beam alternately so that the detector receives radiation from each beam path alternately. The sample under test is placed in the beam path on one of the support members.

The wavelength selection devices may be in the form of diffraction gratings with reflecting members in the well-known Littrow arrangement, or in the form of prisms with mirrors also in the well-known Littrow arrangement, or they may take the form of interference filters.

The beam paths on each support member, whilst being parallel to the plane of the member, can be turned through one or more angles to give any desired location of the optical components.

By arranging the components in the manner described a much more rigid and compact support structure for the optical components is achieved.

The invention will now be described in one form by way of example with reference to the diagrammatic drawings in which.

Figure 1:
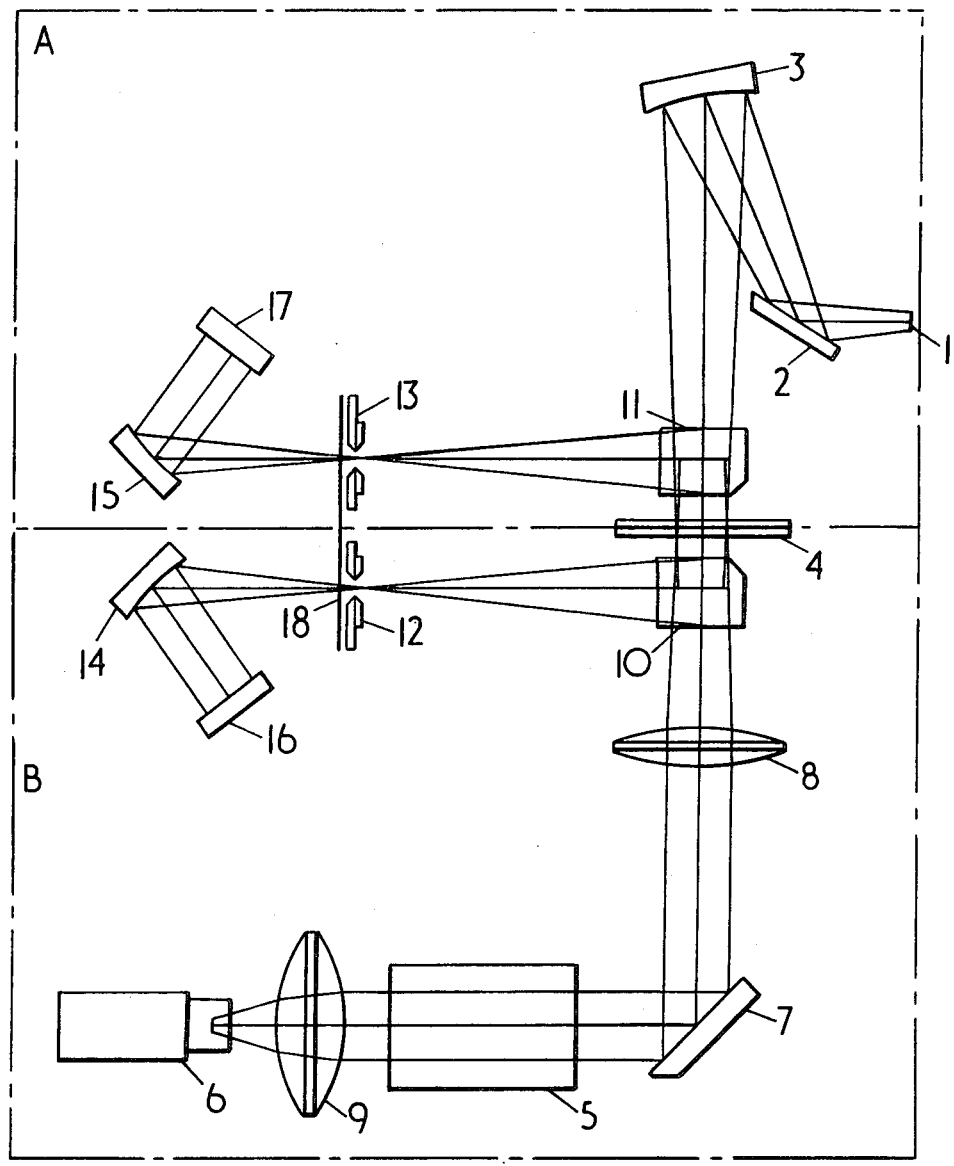
FIG. 1 shows a developed view of the optical components of an infra-red analyzer in accordance with the present invention, with the two support members lying in a common plane to facilitate explanation.
Figure 2:
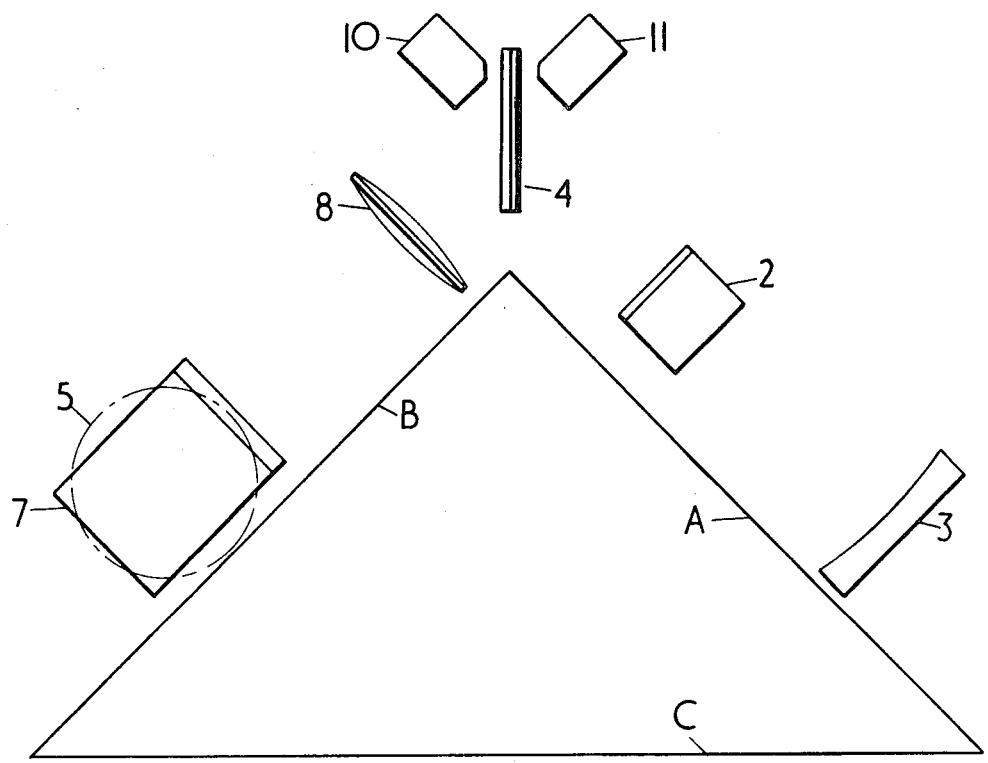
FIG. 2 shows the relative disposition of the support members in intersecting planes.

In carrying the invention into effect in the form illustrated by way of example in FIGS. 1 and 2, an infrared analyzer comprises two support members A and B disposed at an angle to one another as shown in FIG. 2.

As will be seen from FIG. 1, support member A carries a source of infra-red radiation 1, for example, a Nernst filament or a quartz envelope tungsten filament lamp. It also carries mirrors 2 and 3 which direct radiation from source 1 onto a beam splitting device 4. Support member B carries a sample cell 5, radiation detector 6, mirror 7 and focussing lenses 8 and 9.

The beam splitting device may be in the form of a semi-reflecting mirror as in the form shown, and is disposed at an angle to the beam of radiation incident upon it from source 1. Part of the incident radiation passes straight through the device and impinges on mirror 10 whilst part is reflected onto mirror 11.

The mirrors 10 and 11 are disposed at angles such that each beam of radiation received by them from the device 4 is turned through 90° so that it passes along a path parallel to the apex formed by the intersection of members A and B i.e. it passes along a path perpendicular to the plane of the paper when viewed in FIG. 2.

The beam paths running parallel to the apex contain slits 12 and 13 respectively onto which each beam is focussed by mirrors 10 and 11. From the slits 12 and 13 the radiation passes to mirrors 14 and 15 and thence is directed onto diffraction gratings 16 and 17.

A radiation chopper 18 is disposed adjacent the slits preferably on the side remote from the source as shown to interrupt each beam of radiation alternately, the interruptions overlapping in line so that in between the appearance of each beam there is a period when both are obscured.

In operation, radiation from source 1 is directed via mirrors 2 and 3 onto beam splitting device 4. As previously explained part of the radiation passes through the device 4, falls on mirror 10 and is then directed along a beam path including slit 12, mirror 14 and diffraction grating 16. The reflected part of the radiation passes along in beam paths including slit 13, mirror 15 and grating 17.

The diffraction gratings can be of the reflecting type or can each be associated with a mirror in a Littrow mounting and are designed in relation to the incident radiation such that the reflected radiation from grating 16 covers a wavelength band different from that of grating 17. One of the selected bands being a band where absorption will take place in the sample and the other being a band where little or no absorption takes place. The reflected beams are directed back onto the beam splitting device 4 and then pass along a common beam path to sample cell 5 and thence to radiation detector 6. The alternate chopping of the two beam paths means that the detector receives radiation from each beam path alternately.

Whilst the invention has been described with particular reference to an infra-red analyzer it can be used with instruments using radiation of other wavelengths, for example using visible light.

It can be used with any other radiation absorption instruments, such as spectrometers, where it is practicable to locate the optical components on at least two intersecting planes as this leads to a very compact arrangement and the support members can be kept to minimum thickness. The members A and B can be joined by a third member C to form a rigid structure.

I claim:

1. An instrument for analyzing substances by determining their radiation absorption characteristics when subjected to a beam of radiation, wherein the optical components of the instrument are mounted on support members which lie in at least two intersecting planes, said support members comprising two flat members lying at an angle to one another in the manner of a pitched roof with the optical components being supported on each flat member, and wherein a source of infra-red radiation is mounted on one support member and the beam of radiation from the source is directed onto a beam splitting device located adjacent the apex formed by the two support members, from which beam splitting device the beam is formed into two beams which are directed in paths parallel to the apex to fall on wavelength selection devices before being reflected back along parallel paths to fall again on the beam splitter device, from which device the beams are directed along a beam path in the other support member to fall on a radiation detector, radiation chopping means being provided between the beam splitting device and the wavelength selection devices to interrupt each beam alternately so that the detector receives radiation from each beam path alternately, the sample under test being placed in the beam path on one of the support members.

2. An instrument as claimed in claim 1, wherein the wavelength selection devices are in the form of diffraction gratings with reflecting members in the Littrow arrangement.

3. An instrument as claimed in claim 1, wherein the wavelength selection devices are in the form of prisms with mirrors in the Littrow arrangement.

4. An instrument as claimed in claim 1, wherein the wavelength selection devices are in the form of interference filters.

5. An instrument for analyzing substances by determining their radiation absorption characteristics when subjected to a beam of radiation wherein the optical components of the instrument are mounted on at least first and second support plate members which are disposed in at least two intersecting planes, at least one beam path associated with said optical components mounted on said first support plate member being directed substantially in a first plane, and at least one beam path associated with said optical components mounted on said second support plate member being directed substantially in a second plane, said first and second planes intersecting at an angle substantially equal to the angle at which said first and second support plate members intersect one another.

6. An instrument as defined in claim 5, wherein said support plate members comprise two flat plate members disposed at an angle to one another in the manner of a pitched roof with the optical components being supported on each flat plate member.

* * * * *

UNITED STATES PATENT OFFICE
CERTIFICATE OF CORRECTION

Patent No. 3,700,898  Dated 24 October 1972

Inventor(s) Hugh Angus McIntosh Macleod

It is certified that error appears in the above-identified patent and that said Letters Patent are hereby corrected as shown below:

The spelling of the Assignee's name in the above-mentioned pattent is incorrect and should be changed to read:

Sir Howard Grubb Parsons & Company Limited.

The Assignment was recorded on Reel 2706, Frame 675, on February 3, 1971.

Signed and sealed this 17th day of April 1973.

(SEAL)
Attest:

EDWARD M. FLETCHER, JR.
Attesting Officer

ROBERT GOTTSCHALK
Commissioner of Patents